United States Patent Office 3,537,299
Patented Nov. 3, 1970

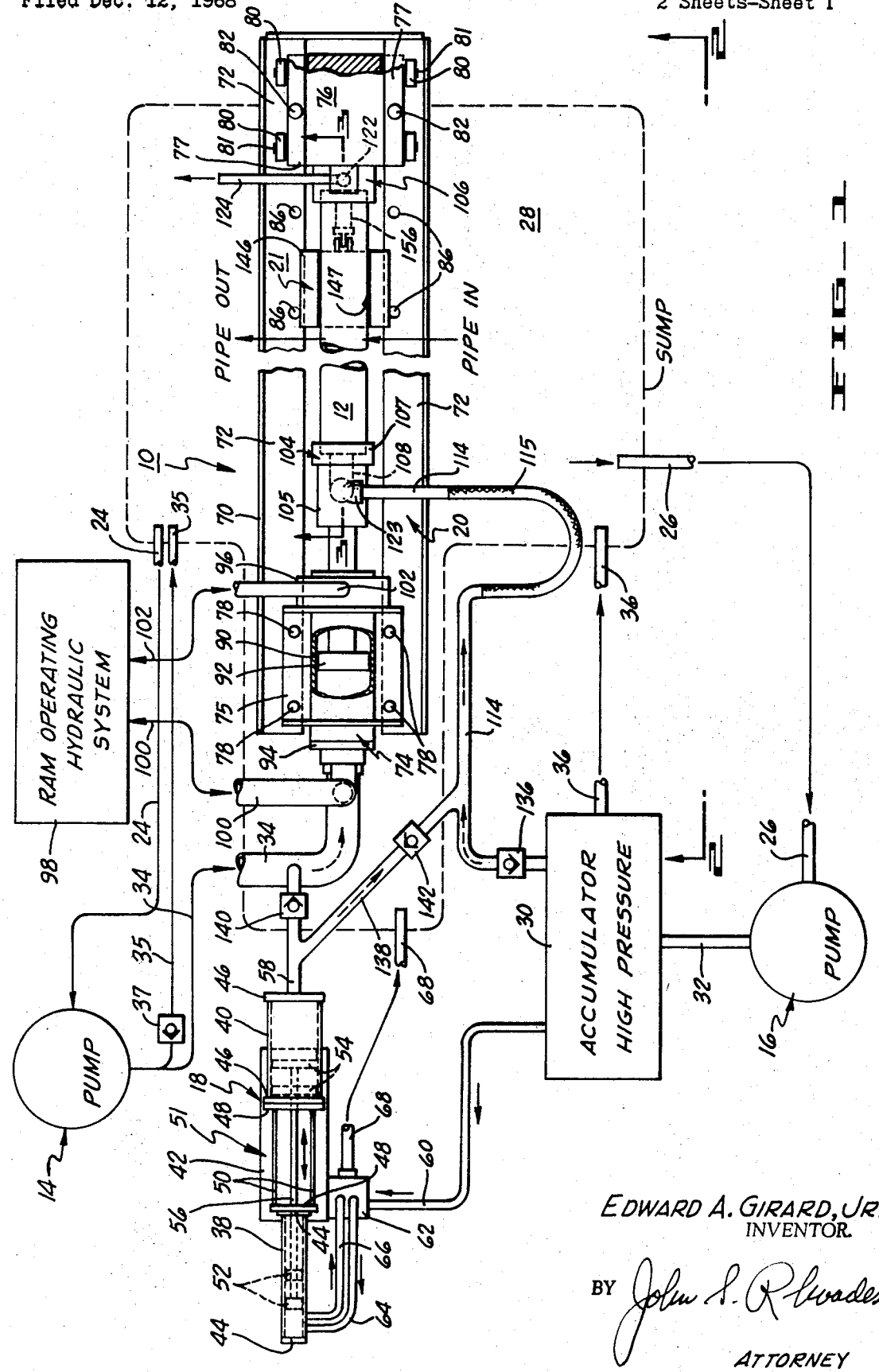

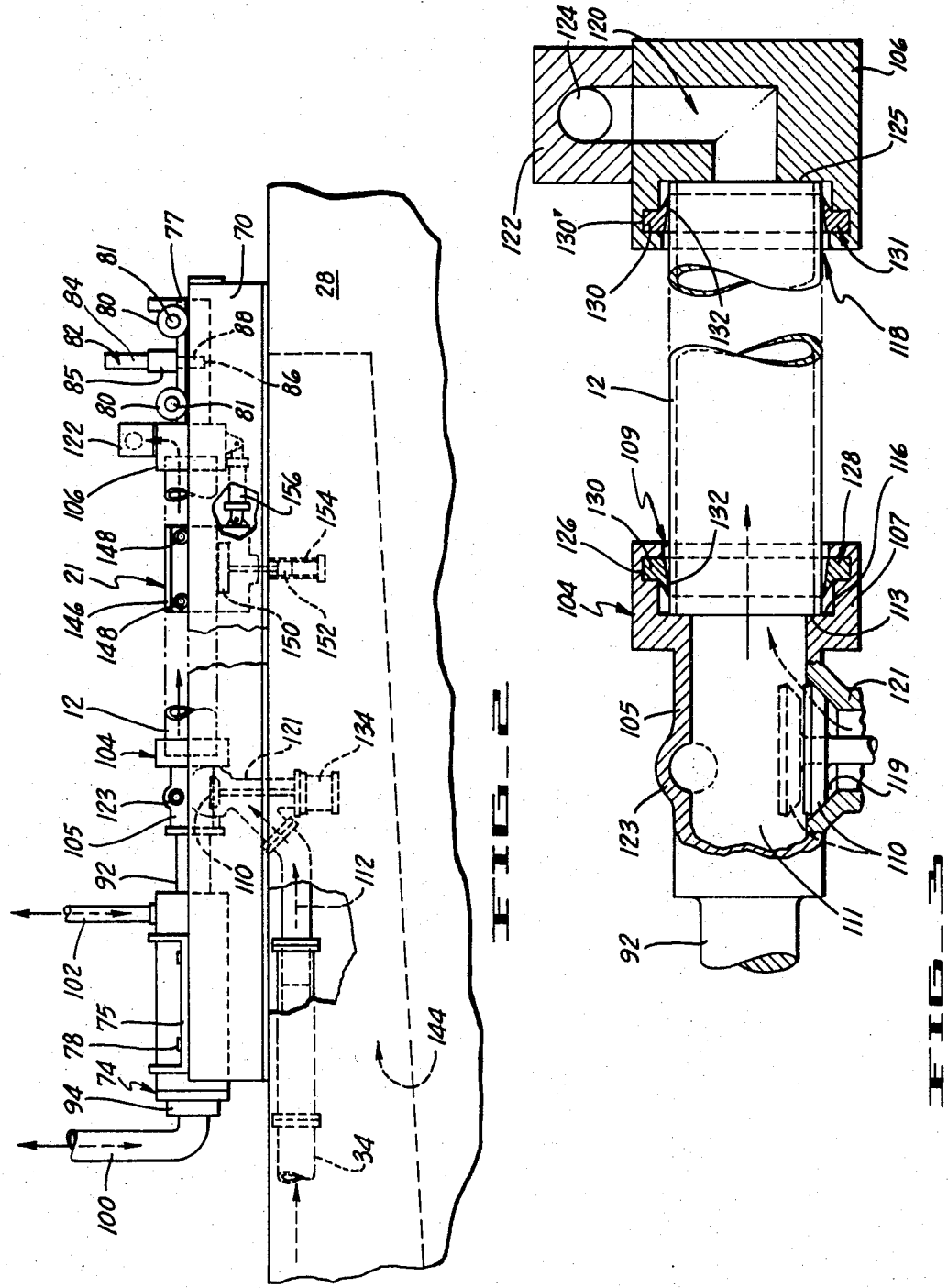

3,537,299
SYSTEM FOR SUBJECTING A HOLLOW BODY TO FLUID UNDER PRESSURE
Edward A. Girard, Jr., Upland, Calif., assignor to Kaiser Steel Corporation, Oakland, Calif., a corporation of Nevada
Filed Dec. 12, 1968, Ser. No. 783,332
Int. Cl. G01m 3/04
U.S. Cl. 73—49.4
17 Claims

ABSTRACT OF THE DISCLOSURE

A system for subjecting the interior of a hollow body to fluid under pressure to rapidly test the body for physical defects. The system is provided with a series of sources of fluid under different pressures and an intensifier connected to said sources. The fluid sources, the intensifier and the interior of a body to be tested are interconnected by piping and valving whereby fluid under pressure can be initially directed from one fluid source to substantially fill the interior of the body to be tested in order to initially purge the interior of the body of air. Afterwards, fluid under pressure from a second source and the intensifier is used to raise the pressure level of the fluid within the interior of the body to a predetermined testing pressure level. The body can now be inspected for physical defects such as holes, cracks and the like.

BACKGROUND OF THE INVENTION

This invention relates to a system for subjecting a hollow body to fluid under different pressures. More particularly, it relates to an improved system including means for subjecting the interior of the body to fluid at different given pressures so as to successively purge the interior of the body of air and the like and then effectively pressurize in a unique fashion the purged interior of the body to a predetermined pressure level.

In the past, various systems have been devised for subjecting hollow bodies to a fluid under pressure for the purposes of checking a hollow body against physical defects, etc., as exemplified by the U.S. Pat. 1,368,147 to Hennebohle granted on Feb. 8, 1921, and U.S. Pat. 2,633,-739 to Potts et al. granted on Apr. 7, 1953. These prior systems, however, required complicated piping and valving systems and were relatively slow acting.

SUMMARY OF THE INSTANT INVENTION

The instant invention is primarily concerned with an improved system for subjecting a hollow body to fluid under different pressures in a relatively short time, so as to test the same against physical defects, etc.

With reference to the accompanying drawings, a brief description is as follows:

FIG. 1 is a diagrammatic overall plan view, parts of which are broken away and other parts of which are shown in dotted lines of a preferred form of apparatus for carrying out the instant invention;

FIG. 2 is a partial elevational view taken along line 2—2 of FIG. 1 and with parts broken away; and FIG. 3 is an enlarged and fragmentary diametrical sectional view taken generally along line 3—3 of FIG. 1.

With further reference to the drawings, and particularly FIGS. 1-2 thereof, a preferred embodiment of an improved system 10 is illustrated for carrying out the teachings of the instant invention wherein the interior of a hollow body or workpiece 12 can be subjected to fluid under pressure at different selected pressure levels in an extremely short period of time. The system 10 includes a first source of fluid under pressure 14, a second source 16 of fluid under pressure with the latter fluid being at a higher pressure level than the fluid from said first source and an intensifier 18 for raising the pressure level of the first source 14 to a level intermediate of the first and second sources 14 and 16.

Depending on the shape and size of the hollow body 12 to be checked or tested, etc., a suitable article clamping device 20 may be required for clampably holding the body 12 during subjection of the body 12 to fluid under pressure. If the hollow body is of relatively large size, the clamping device 20 may be provided with an ejector 21.

Fluid sources 14 and 16, the intensifier 18 and the interior of the hollow body 12 are all interconnected by suitable piping and valving to be later described in detail whereby fluid under pressure can be initially directed from the first source 14 for substantially filling the interior of the body 12 in order to initially purge the interior of the body 12 of air. Thereafter, after substantially filling the purged interior of the body 12 with fluid under pressure from the first source 14, fluid under pressure from the intensifier 18 and the second source 16 is used to raise the pressure level of the fluid under pressure within the interior of body 12 to a predetermined pressure level such as the testing pressure level.

The body 12 in being subjected to fluid under pressure at a predetermined level by the system 10 can thus be inspected for physical defects such as holes, cracks, etc., that might otherwise be undetectable. It is to be understood that use of the improved system 10 in subjecting hollow bodies to fluid under pressure is not necessarily limited to the inspection thereof. The instant system could be advantageously used in other applications such as the forming or shaping of a given hollow body. The invention will be described, however, with respect to its use in testing pipe.

When the system is used for testing and involves use of a clamping device 20 and the hollow body 12 to be tested is a pipe-like section of metal or the like, the clamping device 20 may include means for facilitating interconnection of the first and second sources 14 and 16 and the intensifier 18 to the interior of the hollow body 12, as will be subsequently described.

With further reference to the drawings, a common sump 28 supplies fluid to the first and second sources 14 and 16 by means of piping or conduits 24 and 26. The common sump 28 can be of approximately T-shaped configuration as viewed in FIG. 1 and can be made of the usual plates which are welded together. A suitable source of fluid supplied by the sump 28 is water. Other fluids could be used, if desired, and their use will depend to some extent on the type of material of which the hollow body is composed, so as to prevent harmful attack thereon. By virtue of the pressures to which a hollow body 12 is subjected in accordance with the teachings of the improved system 10 of the instant invention, the chosen fluid should also have the characteristic of being relatively incompressible in order to maintain the fluid at a desired pressure for an optimum period of time to achieve the results desired.

In order for the first and second fluid sources 14 and 16 to supply fluid under pressure at different pressure levels to the intensifier 18 and the interior of the body 12, the first and second sources preferably comprise piston-operated suction pumps. Depending upon the volumetric capacity of the interior of the body 12 such as steel pipe, an appropriate accumulator 30 may be required for accumulating and maintaining a sufficient amount of fluid under pressure from the second source 16 at the higher pressure level in order to meet the demands of the intensifier 18. Accumulator 30 is connected to the second fluid source 16 by the conduit 32 and to fluid source 14 by conduits 34, 58, 138 and 114. Accumulator 30 includes the usual drain conduit 36 connected to the sump 28 in order to prevent overloading of the pump 16. Similarly a drain conduit 35 provided with a relief valve 37 is connected to conduit 34 for relieving excess fluid pressure acting on the pump 14. In order to prevent malfunction of the system 10 during operation thereof, filters, not shown, may be connected to the inlet conduits 24 and 26 of the first and second sources 14 and 16.

The intensifier 18 is comprised of a plurality of interconnected fluid actuators 38 and 40 and a framework 42 for supporting the actuators 38 and 40 in operative relation to each other, all as indicated in FIG. 1. The actuators 38 and 40 are comprised of separate cylinders, and the ends of these cylinders are closed off by way of cap elements 44 and 46. Actuators 38 and 40 are mounted at opposite ends of the framework 42 such that their longitudinal axes are in alignment, as depicted in FIG. 1. The cylinder of actuator 38 generally corresponds in length to that of the cylinder for actuator 40, although it is smaller in transverse cross section. The importance of these size features will become more apparent hereinafter.

A pair of spaced plates 48 and a pair of parallel spaced rods 50 extending between and connected to the plates 48 all cooperate to form a bridging element 51. The bridging element 51 is interposed between and connected to adjacent caps 44 and 46 of the actuators 38 and 40 and acts to maintain the actuators 38 and 40 in longitudinal alignment. A common piston rod 56 passes through aligned apertures (not shown) in plates 48 and plate adjoining caps 44 and 46 of the actuators 38 and 40. A pair of pistons 52 and 54 carried by the opposing ends of piston rod 56 are slidably disposed inside the respective actuators 38 and 40.

Intensifier 18 is connected to fluid source 14 by means of the large conduit 34 and a branch conduit 58. Conduit 60 interconnects accumulator 30 with the solenoid operated valve 62 which is included in the piping and valving of the overall fluid system. Branch conduits 64 and 66 are connected to the actuator 38 on the free side of its piston 52 and to the solenoid operated valve 62. Solenoid operated valve 62 operates to selectively direct fluid under pressure from the accumulator 30 to the actuator 38 at the proper time through conduits 60 and 64 in order to effect advancement of both pistons 52 and 54 to the right as viewed in FIG. 1. Solenoid operated valve 62 is also used for selectively directing fluid under pressure from the actuator 38 to the sump 28 through the medium of conduits 66 and 68 in order to effect advancement of both pistons 52 and 54 to the left as viewed in FIG. 1 when fluid from source 14 is connected to the other actuator 40 by the conduits 34 and 58 upon the appropriate positioning of valve 62.

When as noted above an article clamping device 20 is used, this clamping device can comprise a framework 70. A fluid actuator 74 is mounted at one end of the framework 70 and a platen 76 is movably mounted at the other end thereof in longitudinal alignment with fluid actuator 74. The top of framework 70 is recessed to define a pair of laterally spaced rail portions 72. Fluid actuator 74 fits within a bracket or saddle 75, and the outer flanged ends of bracket 75 are connected to the spaced rail portions 72 by appropriate cap screw assemblies 78.

Actuator 74 is comprised of a cylinder 90 and a piston rod or ram subassembly 92. The ends of cylinder 90 are closed off by cap elements 94 and 96 and cap element 96 has an aperture for receiving the rod end of the piston rod subassembly 92. In order to move the piston of the piston rod subassembly 92 between the capped ends 94 and 96 of the cylinder 90, a hydraulic ram operating system 98 is connected to the cap ends 94 and 96 of the cylinder 90 by conduits 100 and 102. The system 98 is comprised of the usual source of hydraulic fluid and pump (not shown) for alternately supplying fluid under pressure to lines 100 and 102, and a valve (also not shown) is used for selectively directing fluid under pressure either to line 100 or line 102. If fluid is directed by such a valve in system 98 through the conduit 100, the ram 92 will be stroked to the right as viewed in FIGS. 1–3, while fluid is evacuated from the other end of cylinder 90 through line 102. When this valve is reversed, ram 92 is moved in a reverse direction.

Platen 76 is movably mounted relative to the ram actuator 74 in order that the clamping device 20 can be selectively adjusted to accommodate pipe sections 12 of different lengths. The platen 76 is generally comprised of a body of approximately box-shaped configuration and includes opposed longitudinally extending flanges 77 at the top thereof. The bottom of the platen 76 slidably fits in the recess between the spaced rail portions 72. Stub shafts 81 are bearingly affixed to the opposed longitudinal edges of the flanges 77 and project outwardly therefrom in such fashion that the axes of the shafts 81 lie in a common horizontal plane and wheels 80 are carried on the ends of shafts 81. Wheels 80 rollingly engage the top surfaces of rail elements 72 of the framework 70.

In order to anchor platen 76 in a desired position relative to ram actuator 74, the platen 76 carries a pair of conventional locking pin assemblies 82. Each pin assembly 82 is comprised of a solenoid mechanism 85, a spring retainer 84 located atop mechanism 85 and a locking pin 88 disposed within suitably aligned and concentric apertures (not shown) of the retainer 84 and solenoid mechanism 85. The pin 88 of each one of the assemblies 82 is of a length such that the biasing action of the solenoid mechanism spring urges the pin to project downwardly at the lower end of each one of the assemblies 82 as viewed in FIG. 2.

A series of transversely aligned pairs of apertures 86 are provided in the spaced rail portions 72 of the framework 70 at the platen end thereof for receiving the outer ends of the pins 88 of the locking assemblies 82. As indicated in FIGS. 1–2, the pins 88 are disposed within the rightwardmost pair of apertures 86, thereby anchoring the platen 76 relative to the ram actuator 74 in order that the ram actuator 74 and platen 76 cooperate to clampingly engage the ends of a given pipe section 20 to be clampingly held therebetween.

If a pipe section of smaller length than that illustrated is to be clamped between the platen 76 and the ram 74, the solenoid mechanisms 85 are electrically energized to hold pins 88 in a retracted position until the platen 76 is moved and positioned in alignment with the proper pair of apertures 86. The solenoids 85 are then de-energized so that the pins 88 can be released and allowed to drop into the proper pair of apertures 86, thereby securing the platen 76 in a desired position relative to the ram 74.

In an advantageous embodiment of the invention the opposed ends of the ram 74 and platen 76 include hollow fixtures 104 and 106. The fixtures 104 and 106 not only receive and clampingly engage the opposed ends of a given pipe section 12, but also assist in selectively interconnecting the interior of the given pipe section 12 to the first and second sources 14 and 16, the intensifier 18 and the sump 28.

As indicated particularly in FIG. 3, fixture 104 has an annular configuration and is comprised of hollowed out main body portion 105 and head portion 107. The body portion 105 is attached to and closed off by the forward exposed end of the ram sub-assembly 92. Head portion 107 include the enlarged opening 109 for freely receiving an end of a pipe section 12, a shoulder 113 and an annular groove 126 within which a seal ring 128 of appropriate resilient and impervious material is seated. The ring 128 has an enlarged portion 130 of rectangular shaped configuration in transverse cross section at the outer periphery thereof disposed within the groove 126 and a reduced portion 132 at the inner periphery thereof of wedge-shaped configuration in transverse cross section integrally formed with portion 130. The innermost peripheral edge of the wedge-shaped portion 132 has a diameter that is somewhat smaller than the associated end of a given pipe section 12 to be tested so that the seal 128 will fully sealably engage an outer peripheral portion of such pipe section.

Body portion 105 of the fixture 104 includes an opening 111 which at the outer end thereof is in direct open communication with the inner end of the opening 109 of the larger section 107. The bottom of body portion 106 has a radial inlet port 119, and the top of body portion 105 is also ported by means of a small tangential inlet port 123 that is disposed substantially above the inlet 119.

Port 119 is connected to the stem portion of a fitting 121 of approximately Y-shaped configuration. One of the legs of the fitting 121 is connected to a telescopic conduit section 112. The other end of the telescopic conduit section 112 is connected to the outlet conduit 34 of the first source 14. The other leg of fitting 121 is connected to a solenoid mechanism 134. A poppet-type valve 110 is disposed in the frusto-conical seat of the inlet port 119 and the operation of valve 110 is controlled by solenoid mechanism 134. Solenoid mechanism 134 normally biases the poppet valve 110 to the closed position indicated by solid lines in FIG. 3 and when appropriately operated acts to move valve 110 to the open position shown by dotted lines in FIGS. 2 and 3. When valve 110 is opened and withdrawn from its seat in port 119 it places the opening 111 of the fixture 104 in open intercommunication with the fitting 121, telescopic conduit assembly 112 and conduit 34 for admitting fluid under pressure from the first fluid source 14 into fixture 104.

The telescopic conduit assembly 112 is made of up two sections, one slidable within the other. As indicated in FIG. 2 the sections of the assembly 112, which are suitably carried by clamping assembly 20, telescope relative to each other in a direction corresponding to the direction of stroke of the ram 92 thereby maintaining fluid intercommuniction of the first source 14 with fixture 104 irrespective of a given position of ram 92.

Inlet port 123 of the fixture 104 is connected to one end of conduit 114 while the other end of conduit 114 is connected to the accumulator 30 and through the medium of accumulator 30 and line 32 to the second fluid source 16. Line 114 is also connected to line 138 that leads to line 58. As in the case of the telescopic conduit assembly 112, the conduit 114 includes an intermediate conventional flexible section 115 for compensating for the stroke movement of the ram 92 in either direction while at the same time maintaining fluid intercommunication between the second source 16 of fluid under pressure and the fixture 104.

Fixture 106 attached to the platen 76 in opposition to the fixture 104 includes an opening 118 corresponding to the opening 109 of fixture 104 and longitudinally aligned therewith for receiving the other end of a pipe section 12 in the manner depicted in FIGS. 2–3. The inner cylindrical surface of fixture 106 defining the opening 118 includes an annular groove 130' for receiving a seal ring 131 similar in structure and configuration to the seal ring 128 of fixture 104. A solenoid operated vent valve 122 is affixed to the top of fixture 106 and this valve connects the L-shaped opening 120 of the fixture 106 with the sump 28 by means of a conduit 124. The opening 118 in fixture 106 communicates with opening 120 and includes a shoulder 125.

When a given pipe section 12 is disposed between the fixtures 104 and 106, the ends of the pipe section are clampingly engaged within the openings 109 and 118 of the fixtures 104 and 106 in such a fashion, upon advancement of the ram 92 towards the platen 76, that the ends of the pipe section 12 abuttingly engage the shoulders 113 and 125 of the fixtures 104 and 106. At the same time the seals 128 and 131 sealably engage the outer peripheral portions of the pipe section 12.

After operating the ram 92 by its own hydraulic system 98 to clampably and sealably engage pipe section 12 between the fixtures 104 and 106, the solenoid operated valve 110 and the vent valve 122 are both simultaneously opened by the operator in order to purge the interior of the given pipe section 12 of a medium such as air and to substantially fill the interior of the pipe section with fluid under pressure from the first fluid source 14.

At this time the fluid passes from source 14 through lines 34 and 112 and opening 119 in fixture 104 into the pipe section 12 and then out through valve 122 to the sump 28. After exiting of sufficient fluid under pressure through the vent valve 122 to insure a complete evacuation of air, valve 122 is closed by the operator and fluid backs up in the system and pipe section 12 whereby it is filled with fluid.

When fluid under pressure is admitted to the interior of the pipe section 12 from fluid source 14, it tends to expand the pipe section slightly and effect a full sealing contact between the pipe 12 and the seals 128 and 131.

By reference particularly to FIG. 1, it will be observed that conduit 58 contains a ball type one way check valve 140 which blocks flow of fluid under pressure from line 58 to the main conduit 34 back towards source 14. One way check valve 142 in conduit 138 blocks backward flow of fluid under pressure in conduit 138. A solenoid operated check valve 136 located in conduit line 114 adjacent the point where line 114 enters accumulator 30 provides a one way flow of fluid away from the accumulator 30.

After closure of vent valve 122 and with fluid under a relatively low pressure from the first source 14 substantially filling the interior of pipe section 12 held in clamping device 20, the pipe section 12 is next subjected to a higher pressure by bringing fluid intensifier 18 into play. Intensifier 18 is activated in the following fashion. Solenoid mechanism 134 is energized whereby valve 110 is closed about its seat in opening or part 119 and flow of fluid through lines 34 and 112 to fixture 104 is cut off. As the fluid backs up in lines 112 and 34 check valve 140 in line 58 remains open. Fluid from source 14 then passes through line 58 against piston 54 in actuator 40 thereby moving piston 54 to its fully extended left hand position as shown in the drawings. When the operator activates valve control 134, he also turns valve 62 for intensifier 18 so that actuator 38 of the intensifier 18 can be directed to the sump 28 through the conduits 66 and 68. This permits movement of both pistons 52 and 54 to the left in FIG. 1 in response to admission of fluid under pressure to the actuator 40 of intensifier 18 from the first source 14 through conduits 34 and 58 while fluid exits from actuator 38 of intensifier 18 through conduits 66 and 68.

After the pistons 52 and 54 of the intensifier 18 have been stroked to the left in FIG. 1, the operator moves valve 62 to disconnect conduits 66 and 68 and to connect conduits 60 and 64 for supplying fluid under pressure from fluid source 16 to the smaller actuator 38 of intensifier 18. Activation of actuator 38 by fluid from source 16 causes stroking of the smaller piston 52 to the right and a corresponding rightward movement of the larger piston 54. As piston 54 acts to compress fluid in lines 58, 138 and 114 it will bring the fluid pressure in pipe section 12 to a higher level than that achieved merely by flow of fluid from source 14 alone. The pressure exerted by the stroke multiplier arrangement provided by pistons 52 and 54 will be sufficient to close check valve 140 in the portion of line 58 leading to line 34 and at the same time open check valve 142 in line 138 so that fluid pressure can be exerted through the medium of the fluid in line 114 that is connected to port 123 of fixture 104.

If desired, at the same time the pressurized fluid at the higher level is being directed from the actuator 40 of the intensifier 18 to the pipe section 12, the operator can simultaneously manipulate valve 136 whereby additional fluid from fluid source 16 and accumulator 30 can be directed into line 114 to boost or elevate the pressure of the fluid acting on the interior of pipe section 12. Once the fluid under pressure from the second source 16 at the higher level acts on the check valve 142 in line 138, it closes the same and closes off fluid interconnection between the intensifier 18 and the pipe section 12.

Although not heretofore mentioned, the pipe section can be fed by suitable means (not shown) to and from the clamping device 20 in the manner indicated by the arrows in FIG. 1. If the formed pipe section 12 includes a longitudinally welded seam, the seam can be oriented in a known manner so as to be at the top of the pipe section when it is clamped between the fixtures thereby facilitating inspection of the pipe section seam against leakage as the pipe section 12 is subjected to fluid under pressure in accordance with use of the system 10 of the instant invention.

After pressurizing pipe section 12 as aforedescribed for the desired period of time, the hydraulic system 98 is operated to move ram 92 to the left and effect disengagement of fixture 104 from the end of the associated pipe section. Prior to disengaging the fixture 104 from the pipe 12, the vent valve 124 is opened by the operator so as to release the fluid under pressure in the pipe section 12 and relax the pipe section relative to the seal rings 128 and 131. After disengagement of fixture 104 and a pipe end, however, the pumps for fluid sources 14 and 16 are stopped, valve 110 is closed and the confined water under the simple influence of gravity flows into the recess between spaced rail portions 72 of the framework 70. This recess in effect forms a holding trough and a bottom opening therein (not shown) leads to a channel-shapped downwardly inclined trough 144 formed in the top of the sump 28 for returning the water to the sump 28.

If the pipe 12 is of relatively large size, the clamping device 20 may include a special ejector 21. This ejector can be fabricated to comprise a shoe element 146 of U-shaped configuration in transverse section, the upper ends of which are flanged. Wheels 148 are rotatably mounted within two pairs of brackets (not shown) which project downwardly from the underneath side of the flanges. These wheels 148 rollingly engage the spaced rail portions 72 of the framework thereby movably mounting the ejector 21 between the fixtures 104 and 106 of the clamping device 20.

A piston and cylinder assembly 156 extends between and is connected to adjacent ends of the shoe element 146 of the ejector 21 and the platen 76 in the manner shown in FIGS. 1–2. Another piston and cylinder assembly 154 is connected to the bottom of the element 146 and projects downwardly therefrom. The rod end of a piston rod subassembly 152 of the main assembly 154 extends through the bottom of the shoe element 146 and is connected to an elevatable platform 150 which rests in its retracted position on the bottom of shoe element 146. The ejector 21 includes the usual releasable clamping elements (not shown) for clampingly engaging peripheral portions of the pipe 12 between the ends thereof when the pipe 12 is disposed between the fixtures 104 and 106 of the clamping device 20.

After completion of a test for a given pipe section 12, both actuators 154 and 156 of the ejector 21 are operated such that the actuator 156 is extended to move the shoe element 146 to the left in the manner shown in FIGS. 1–2, thereby disengaging the other end of the pipe 12 from the platen 76. Then the actuator 154 is operated to extend the piston rod subassembly 152 upwardly, thereby elevating the platform 150 relative to shoe element 146 and pushing the pipe up and out of the element 146 of the ejector in order to eject the pipe from the the clamping device 20. The usual clamping devices (not shown) of the ejector 21, at the same time the platform 150 is being elevated, are released from engagement with the periphery of the pipe.

In an operative embodiment of the improved system 10, a steel pipe having a longitudinally welded seam and the dimensions of 12¾" outside diameter, a length of 60 feet and a wall thickness of ⅛" was subject to a predetermined pressure level of approximately 3500 lbs./in.$^2$ in an optimum time period of approximately 35 seconds. In order to purge and substantially fill the interior of such a steel pipe with water, which required approximately 700 gallons, the first source 14 supplied a relatively high volume of water at 75 lbs./in.$^2$ and the second source 16 supplied a relatively low volume of water at 3,500 lbs./in.$^2$. The intensifier 18 was constructed to have a piston ratio of approximately 10 to 1 and a stroke of approximately 30" thereby raising the pressure level of the water from the first source 14 to an intermediate level of approximately 350 lbs./in.$^2$. By virtue of the relatively short time period for subjecting a large pipe to water under pressure at a relatively high level, as evidenced by the above operative embodiment, the system 10 is readily adaptable for use as part of a high speed pipe production line in order to inspect a series of mass produced pipe for physical defects.

Although the intensifier has been shown as constructed of a pair of pistons, it could be constructed of more than a pair of pistons. Although the various valves making up the valving components of the system have been described as being manually operated, it is to be understood that they could be suitably sequentially operated by a fully automatic or semiautomatic electrical control system. Even though the improved system 10 has been described for subjecting the interior of a hollow body to fluid under pressure, it is to be understood that the system 10 could readily be modified for subjecting the exterior of a hollow body to fluid under pressure if such is desired. If a hollow body is provided with no open ends, the first and second sources 14 and 16, intensifiers 18 and vent valve 122 can be directly and appropriately connected to the hollow body.

Advantageously embodiments of the instant invention have been disclosed and described. It is obvious that various changes and modifications may be made therein without departing from the spirit and scope thereof as defined by the following appended claims, wherein:

What is claimed is:

1. A system for subjecting the interior of a hollow body to fluid under pressure, said system comprising a first source of fluid under pressure; a second source of fluid the pressure level of which is relatively higher than that of said first source; an intensifier for increasing the pressure of fluid from said first source to a pressure level intermediate that of said first and second sources, means for connecting said fluid sources and said intensifier to the interior of said body, said intensifier including a plurality of interconnected pistons of differing cross-sectional areas and means associated with said first and second fluid sources for selectively directing fluid under pressure from said first and second sources to said intensifier and the interior of said body, said associated means including a first means for directing fluid from one of said sources to the interior of the body so as to substantially fill the interior of said body with fluid under pressure at a preselected level, a second means for actuating said intensifier so as to effect compression of the fluid previously introduced into the interior of said body at the said preselected pressure level and a third means for directing fluid from the other one of said fluid sources towards the interior of said body so as to raise the level of pressure of the fluid in the interior of said body to a final test pressure.

2. A system as set forth in claim 1 in which said intensifier is comprised of a pair of pistons and a common piston rod interconnecting said pistons, one of the pair of pistons being of smaller cross-sectional area than the other.

3. A system as set forth in claim 2 in which said second fluid source is connected to the one piston of the pair of pistons that has the smaller cross-sectional area.

4. A system as set forth in claim 2 in which said first fluid source is connected to the other piston of the pair of pistons that has the larger cross-sectional area.

5. A system as set forth in claim 1 in which said first source includes a pump means for suppling fluid under pressure at a given pressure level.

6. A system as set forth in claim 1 in which said second source includes a pump means for suppling fluid under pressure at a given pressure level higher than said first source.

7. A system as set forth in claim 1 in which said second source includes means for accumulating and maintaining a volume of fluid under pressure at a level higher than said first source prior to selectivity directing the fluid under pressure from said second source to said intensifier and the interior of said body.

8. A system as set forth in claim 1 in which the interior of said hollow body is subject to a test pressure at the predetermined level of approximately 3,500 lbs./in.$^2$ in a period of approximately 35 seconds.

9. A system as set forth in claim 1 in which said means connecting said fluid sources and intensifier with the interior of the hollow body is comprised of a clamping device.

10. A system as set forth in claim 9 in which said clamping device is provided with an advanceable ram and a platen aligned with and spaced from said ram, said ram and said platen including means for clampably engaging the hollow body disposed therebetween.

11. A system as set forth in claim 10 in which said clamping device includes an ejector for disengaging and ejecting the hollow body from the clamping device at selected times.

12. A system for subjecting the interior of a hollow body to fluid under pressure, said system comprising a first source of fluid under pressure, a second source of fluid the pressure level of which is relatively higher than that of said first source, an intensifier for increasing the pressure of fluid from said first source to a pressure level intermediate that of said first and second sources and means for connecting said fluid sources and said intensifier to the interior of said body, said intensifier including a plurality of interconnected pistons of differing cross-sectional areas and means associated with said first and second fluid sources for selectively directing fluid under pressure from said first and second sources to said intensifier and the interior of said body, said associated means including a first means for directing fluid from one of said sources of fluid to and through the interior of the body in order to effect substantial purging and filling of the interior of said body with fluid under pressure at a preselected level, a second means for actuating said intensifier so as to effect compression of the fluid previously introduced into the interior of said body at the said preselected pressure level and a third means for directing fluid from the other one of said fluid sources towards the interior of said body so as to raise the level of pressure of the fluid in the interior of said body to a final test pressure.

13. A system as set forth in claim 12 in which said first means is comprised of an inlet valve means and an outlet valve means.

14. A system as set forth in claim 12 in which both said second and third means comprise a valve means.

15. A system as set forth in claim 12 in which said means connecting said fluid sources and said intensifier with said hollow body comprise a clamping device, said device having an advanceable ram and a platen aligned with the ram whereby said platen and ram can cooperate to clampingly engage a hollow body disposed therebetween.

16. A system as set forth in claim 15 wherein said body is a hollow pipe section and said ram and said platen include means for sealably engaging the ends of said pipe section.

17. A system as set forth in claim 15 wherein said platen is adjustable relative to said advancing ram in order to effect clamping engagement of hollow bodies of different lengths disposed between said ram and said platen.

References Cited

UNITED STATES PATENTS

| | | | |
|---|---|---|---|
| 1,368,147 | 2/1921 | Hennebohle | 73—49.4 |
| 2,633,739 | 4/1953 | Potts et al. | 73—49.5 |

S. CLEMENT SWISHER, Primary Examiner

W. A. HENRY II, Assistant Examiner